United States Patent
Wu

(10) Patent No.: US 8,858,193 B2
(45) Date of Patent: Oct. 14, 2014

(54) SPROCKET-DRIVEN AIR PUMP

(75) Inventor: Wen-Ching Wu, Taipei (TW)

(73) Assignee: Dongguan Chengmao Mechanical and Electrical Co., Ltd., Dongguan (CN)

( * ) Notice: Subject to any disclaimer, the term of this patent is extended or adjusted under 35 U.S.C. 154(b) by 91 days.

(21) Appl. No.: 13/586,843

(22) Filed: Aug. 15, 2012

(65) Prior Publication Data

US 2014/0050599 A1    Feb. 20, 2014

(51) Int. Cl.
| F04B 17/06 | (2006.01) |
| F04B 49/00 | (2006.01) |
| B60C 23/12 | (2006.01) |
| F04B 43/00 | (2006.01) |
| H01F 27/06 | (2006.01) |
| B60C 23/10 | (2006.01) |

(52) U.S. Cl.
CPC .............. *B60C 23/12* (2013.01); *F04B 43/009* (2013.01); *H01F 27/06* (2013.01); *B60C 23/10* (2013.01)
USPC ........... 417/233; 417/63; 417/231; 248/230.5

(58) Field of Classification Search
CPC ....... F04B 35/01; F04B 33/005; B60C 23/10; B60C 23/12
USPC ................................. 417/231, 233, 374, 571
See application file for complete search history.

(56) References Cited

U.S. PATENT DOCUMENTS

| 3,750,241 | A  | * | 8/1973 | Bootha ............................ 24/279 |
| 6,227,810 | B1 | * | 5/2001 | Huang et al. .................... 417/63 |
| 7,228,788 | B1 | * | 6/2007 | Chen ............................ 92/181 P |
| 7,275,477 | B1 | * | 10/2007 | Chen ............................. 92/183 |
| 2003/0206816 | A1 | * | 11/2003 | Chen ............................. 417/415 |
| 2007/0212242 | A1 | * | 9/2007 | Chen ............................. 417/571 |

FOREIGN PATENT DOCUMENTS

CN   2169563   *   6/1994   ............. B60C 23/10

OTHER PUBLICATIONS

CN2169563: English Translation of Specification and Orginal Document, Jun. 1994, Jianming.*

* cited by examiner

*Primary Examiner* — Bryan Lettman
*Assistant Examiner* — Christopher Brunjes
(74) *Attorney, Agent, or Firm* — Leong C. Lei

(57) ABSTRACT

The air pump is installed on the frame of a bicycle which utilizes the sprocket of the bicycle as the power source. The air pump contains a cylinder member, a transmission member, and a positioning member. The positioning and transmission members are connected to the cylinder member. The positioning member allows the adjustment and positioning of the cylinder member along the bicycle frame so that the cylinder member can be engaged by a front sprocket of the bicycle. The transmission member contains a shaft and a gear. The shaft has one end connected to the cylinder member and another end connected to the gear. When a rider rotates the front sprocket, the rotational power is delivered to the gear and then to the shaft of the transmission member, which in turn drives the cylinder member to pump air for inflation.

7 Claims, 4 Drawing Sheets

SPROCKET-DRIVEN AIR PUMP

(a) TECHNICAL FIELD OF THE INVENTION

The present invention generally relates to air pumps for inflating tires, buoys, balls, etc., and especially relates to a portable air pump installed on a bicycle and driven by the sprocket of the bicycle.

(b) DESCRIPTION OF THE PRIOR ART

As people are more concerned with health, living quality, and energy saving, bicycles are no long a mere transportation means. Cycling has become a fashion and is well received by both the old and the young for recreation, exercise, and environmental protection.

Appropriate tire pressure is one of the key factors to a bicycle's performance. If the tire pressure is not enough, the bicycle would be difficult to ride. For a completely flat tire, the bicycle wheel can even be damaged.

Generally a bicycle is not equipped with an air pump for inflating the tire. Therefore, it would be very inconvenient if tire pressure is not enough when riding a bicycle outdoors or in the wilderness. As such, there are small, portable air pumps that can be carried by the rider or directly installed on the bicycle. However, these small air pumps are usually operated by reciprocally manual movement. Due to its small size, each manual movement on the air pump can only produce a limited amount of air for inflation and the performance is inferior. It is quite common that the rider has to spend significant labor and time, especially for high-pressure inflation.

SUMMARY OF THE INVENTION

As such, a novel portable air pump is provided herein for installation on the frame of a bicycle which utilizes the sprocket of the bicycle as the power source.

The air pump contains a cylinder member, a transmission member, and a positioning member. The positioning member and the transmission member are connected to the cylinder member. The positioning member allows the adjustment and positioning of the cylinder member along the bicycle frame so that the cylinder member can be engaged by a front sprocket of the bicycle. The transmission member contains a shaft and a gear. The shaft has one end connected to the cylinder member and another end connected to the gear. The gear and the front sprocket of the bicycle engage each other with their teeth clenched together. In alternative embodiment, the gear can also engage one of the rear sprockets or other gear not on the roller chain as the power source. As such, when a rider rotates the sprocket, the rotational power is delivered to the gear and then to the shaft of the transmission member, which in turn drives the cylinder member to pump air for inflation.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
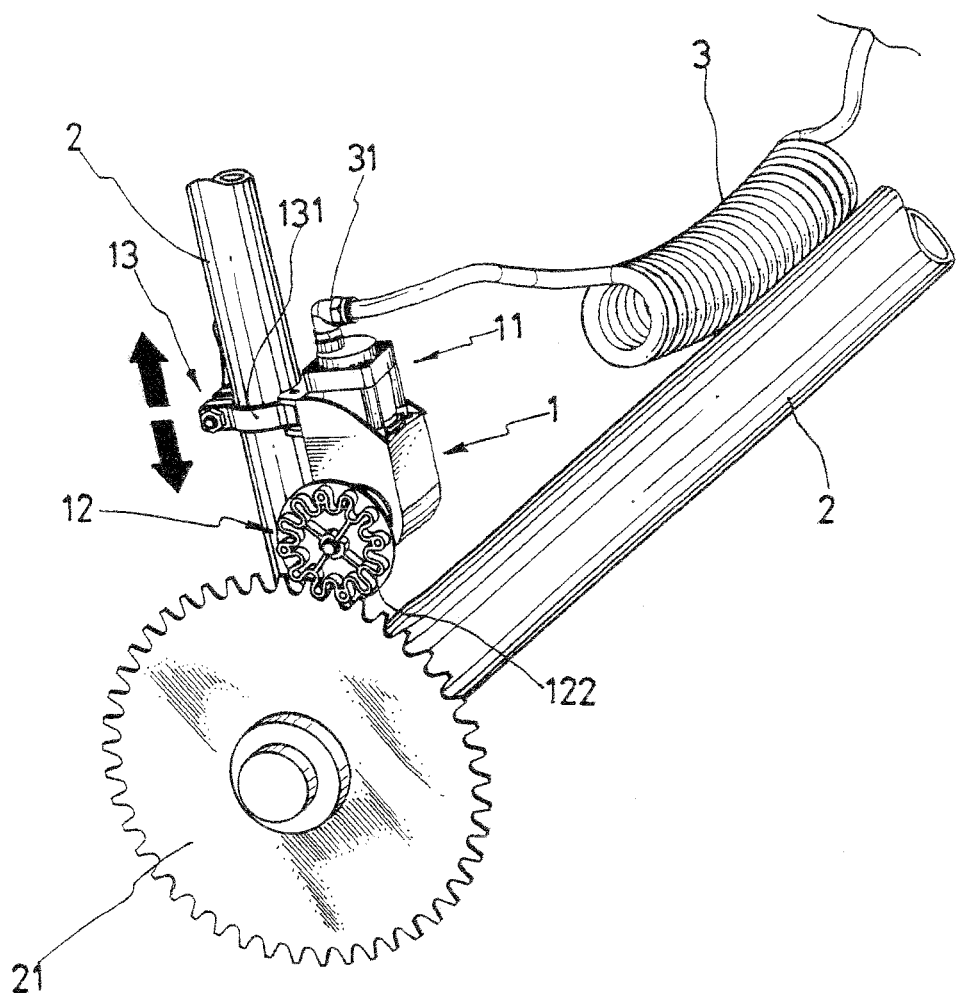
FIG. 1 is a perspective diagram showing an air pump according to an embodiment of the present invention installed on the frame of a bicycle.
Figure 2:
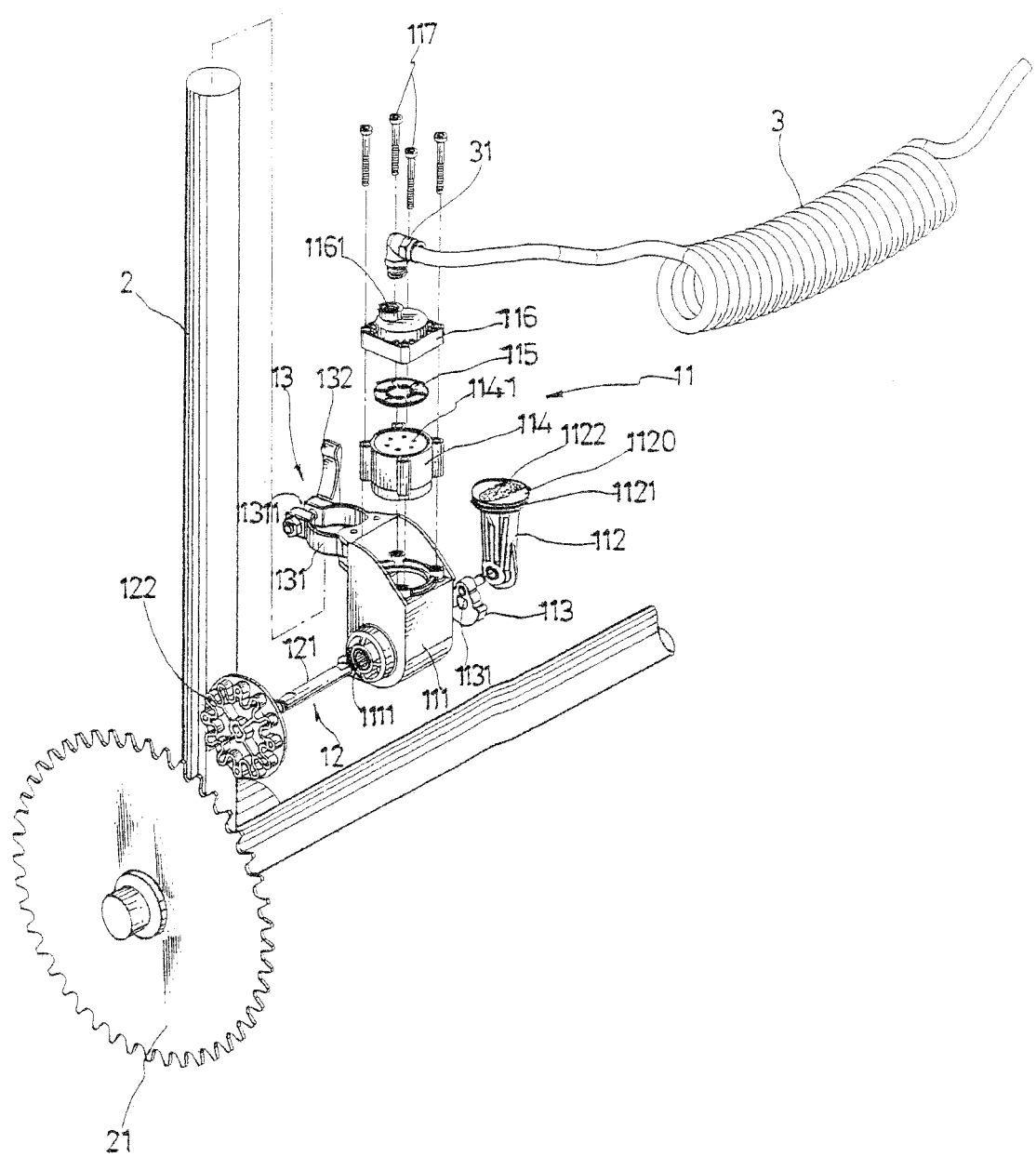
FIG. 2 is a perspective break-down diagram showing the various components of the air pump of FIG. 1.
Figure 3:
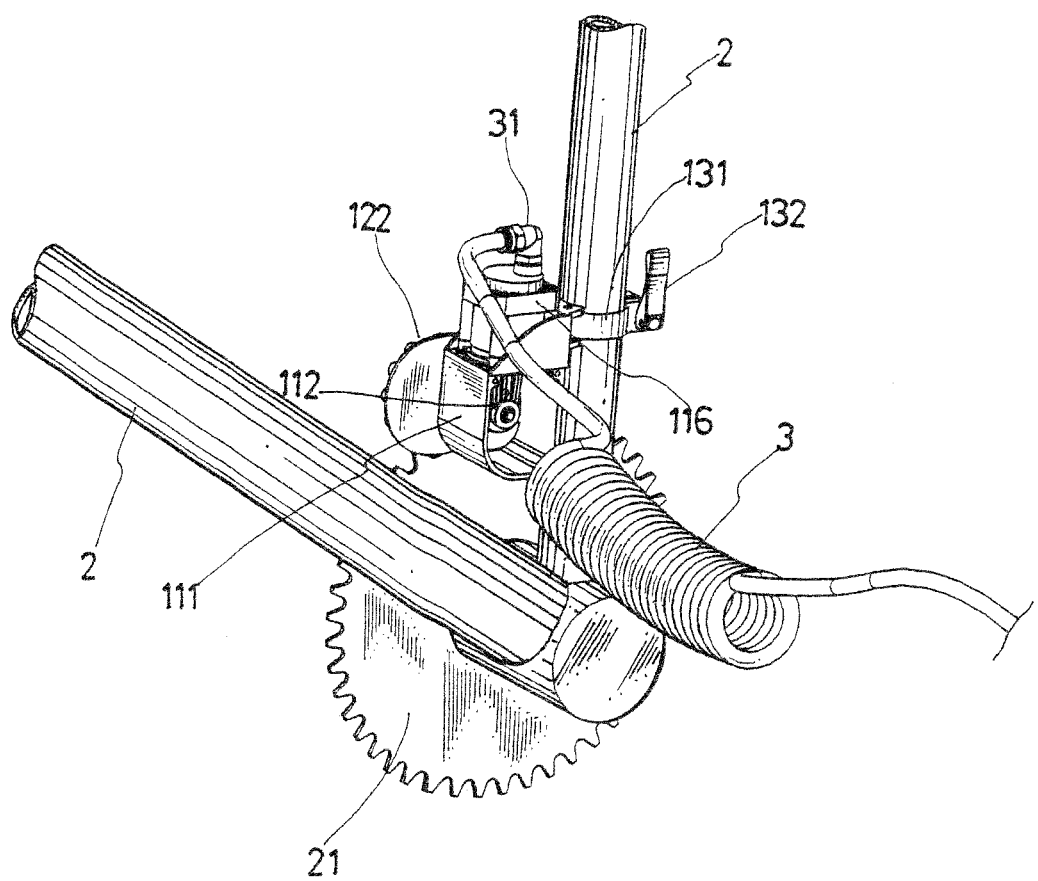
FIG. 3 is a perspective diagram showing the air pump of FIG. 1 from a different viewing angle.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1 to 4, an air pump 1 according to an embodiment of the present invention is installed on a bicycle frame 2 fitted with at least a sprocket 21. The air pump 1 contains a cylinder member 11, a transmission member 12, and a positioning member 13.

The cylinder member 11 is mainly for producing and delivering pressurized air. The cylinder member 11 contains a base 111, a piston shaft 112, an eccentric crank 113, a cylinder 114, an outlet valve 114, a cover 116, and a number of fastening elements 117. The base 111 has a first axial hole 1111 on a lateral side. The piston shaft 112 and the eccentric crank 113 are axially connected and housed inside the base 111. A piston 1120 is positioned at a top end of the piston shaft 112. A piston ring 1121 is configured around the circumference of the piston 1120. An inlet valve 1122 is positioned on a top side of the piston 1120. The inlet valve 1122 is a partially liftable flat piece. The eccentric crank 113 is axially connected to a bottom end of the piston shaft 112, and has a second axial hole 1131 corresponding to the first axial hole 1111 of the base 111. The cylinder 114 is joined to the base 111 and has a hollow chamber inside for accommodating the inlet valve 1122, the piston 1120, and the piston ring 1121. A top side of the cylinder 114 is configured with a number of outlets 1141. The outlet valve 115 is positioned on the top side of the cylinder 114. The outlet valve 115 can be a flat piece and has a number of bulges on a bottom side of the outlet valve 115 corresponding to the outlets 1141 of the cylinder 114. The cover 116 is laid over the outlet valve 115 and joined to the base 111. The cover 116 can be fastened to the base 111 by a number of fastening elements 117. The cover 116 is configured with at least an outlet connector 1161.

The transmission member 12 is connected to the cylinder member 11 to engage the cylinder member 11. The transmission member 12 contains a shaft 121 and a gear 122. The shaft 121 has one end connected to the second axial hole 1131 of the eccentric crank 113 by threading through the first axial hole 1111 of the base 111, and another end connected to the gear 122. The gear 122 and the sprocket 21 engage each other.

The positioning member 13 is connected to the cylinder member 11. The positioning member 13 contains a locking ring 131 and a fastening element 132. The locking ring 131 is connected to the circumference of the cylinder member 11 and the locking ring 131 has an opening so that the locking ring 131 can wrap around the bicycle frame 2. Two corresponding ends across the opening of the locking ring 131 are configured with through holes 1311 so that the fastening element 132 can thread through and tighten the opening of the locking ring 131 so that the air pump 1 is fixedly joined to the bicycle frame 2.

The operation of the air pump 1 is described as follows. A pipe 3 is connected to the air pump 1 by joining a connector 31 of the pipe 3 to the outlet connector 1161 of the cover 116. The piston shaft 112 and the eccentric crank 113 are axially connected. The second axial hole 1131 of the eccentric crank 113 is connected to the shaft 121 of the transmission member 12 so that the shaft 121 can drive the eccentric crank 113 to spin. In turn, the eccentric crank 113 drives the piston shaft 112 into vertically reciprocal movement. When the piston shaft 112 moves upward, the piston 1120 and the piston ring 1121 compress the air in the cylinder 114's chamber and the air flows through the outlets 1141 and pushes the outlet valve 115. Finally, the compressed air flows into the pipe 3 through the outlet connector 1161 of the cover 116. On the other hand, when the piston shaft 112, and thereby the piston 1120 and the piston ring 1121, move downward, the inlet valve 1122 is lifted by the air beneath and, as such, outside air enters the chamber of the cylinder 114. Therefore, by the reciprocal movement of the piston shaft 112, the cylinder member 11 is able to conduct high-pressure inflation continuously.

The position of the cylinder member 11 can be easily adjusted along the bicycle frame 2 through the positioning member 13. When adjusting the position of the cylinder member 11, the sprocket 21 and the gear 122 of the transmission member 12 can be engaged together by clenching their teeth together. Then, by pedaling the sprocket 21, the sprocket 21 drives the gear 122 and the shaft 121 to spin, the shaft 121 then drives the eccentric crank 113 and the piston shaft 112, the cylinder member 11 in turn produces high-pressure air into the pipe 3 so as to inflate a flat tire, etc. The air pump 1 of the present invention therefore is capable of speedy, high-pressure inflation without electricity, in contrast to the low-performance, highly laborious conventional manual air pumps.

After inflation is completed, by adjusting the position of the cylinder member 11, the gear 122 of the transmission member 12 and the sprocket 21 are disengaged. In this way, the air pump 1 of the present invention can be conveniently carried on the bicycle frame 2 as a portable, sprocket-driven inflator.

Figure 4:
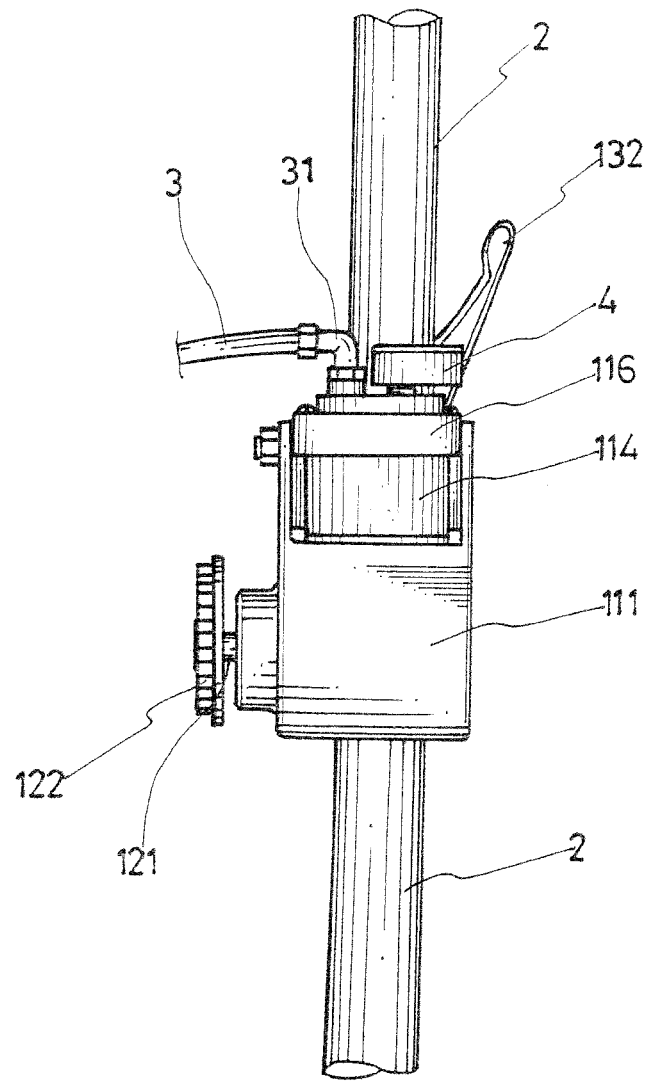
FIG. 4 is a front-view diagram showing an air pump according to another embodiment of the present invention installed on the frame of a bicycle.

As shown in FIG. 4, an air pump 1 according to another embodiment of the present invention has its cover 116 of the cylinder member 11 connected to a pressure gauge 4 so that, during the inflation process, a user can easily monitor and determine the tire pressure so as to meet the tire's requirement.

In other words, the gist of the present invention lies in that the air pump 1 is installed on the bicycle frame 2 and, through the sprocket 21 of the bicycle frame 2, the cylinder member 11 is driven through the transmission member 12 to produce high-pressure air. Therefore, the air pump 1 of the present invention therefore is capable of speedy, high-pressure inflation without electricity, completely obviating conventional manual air pumps.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An air pump installed on a frame of a bicycle, comprising:
    a cylinder member for pumping and delivering air;
    a transmission member connected to the cylinder member, the transmission member comprising a shaft and a gear, the shaft having a first end connected to the gear and a second end to the cylinder member for driving the cylinder member;
    a positioning member connected to the cylinder member, the positioning member comprising a locking ring wrapping around the frame of the bicycle; and
    a pipe connected to the cylinder member; and
    wherein the gear and a sprocket not on a roller chain of the bicycle directly engage each other by have their teeth clenched together; the cylinder member comprises a base, a piston shaft, an eccentric crank, a cylinder, an outlet valve, a cover, and a plurality of fastening elements; the base has a first axial hole on a lateral side; the piston shaft and the eccentric crank are axially connected and housed inside the base; a piston is positioned at a top end of the piston shaft; a piston ring is configured around the circumference of the piston; an inlet valve is positioned on a top side of the piston; the eccentric crank is axially connected to a bottom end of the piston shaft, and has a second axial hole corresponding to the first axial hole of the base; the cylinder is joined to the base and has a hollow chamber inside for accommodating the inlet valve, the piston, and the piston ring; a top side of the cylinder is configured with a plurality of outlets; the outlet valve is positioned on the top side of the cylinder; the cover is laid over the outlet valve and joined to the base; the cover is fastened to the base by the plurality of fastening elements; and the cover is configured with at least an outlet connector.

2. The air pump according to claim 1, wherein the pipe has a connector for connecting the outlet connector of the cover.

3. The air pump according to claim 1, wherein the inlet valve is a partially liftable flat piece.

4. The air pump according to claim 1, wherein the outlet valve is a flat piece and has a plurality of bulges on a bottom side of the outlet valve corresponding to the outlets of the cylinder.

5. The air pump according to claim 1, further comprising a pressure gauge connected to the cover of the cylinder member.

6. The air pump according to claim 1, wherein the second end of the shaft is connected to the second axial hole of the eccentric crank through the first axial hole of the base.

7. The air pump according to claim 1, wherein the positioning member comprises the locking ring and a fastening element; the locking ring connected to the cylinder member; the locking ring has an opening; two corresponding ends across the opening of the locking ring are configured with through holes so that the fastening element threads through the through holes and tightens the opening of the locking ring.

* * * * *